(12) United States Patent
Fox et al.

(10) Patent No.: US 7,783,657 B2
(45) Date of Patent: Aug. 24, 2010

(54) SEARCH AUTHORING METRICS AND DEBUGGING

(75) Inventors: Steven Fox, Bothell, WA (US); Zhenbin Xu, Sammamish, WA (US); Zijian Zheng, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 727 days.

(21) Appl. No.: 11/144,268

(22) Filed: Jun. 3, 2005

(65) Prior Publication Data

US 2006/0277190 A1   Dec. 7, 2006

(51) Int. Cl.
G06F 7/00 (2006.01)
G06F 17/30 (2006.01)
(52) U.S. Cl. .................. 707/763; 707/706; 707/758
(58) Field of Classification Search .......... 707/763, 707/706, 758, 3, 206
See application file for complete search history.

(56) References Cited

U.S. PATENT DOCUMENTS

| | | | |
|---|---|---|---|
| 6,205,441 B1 * | 3/2001 | Al-omari et al. ............. 1/1 |
| 6,708,137 B2 * | 3/2004 | Carley ..................... 702/179 |
| 2003/0013951 A1 * | 1/2003 | Stefanescu et al. ......... 600/407 |
| 2003/0217069 A1 * | 11/2003 | Fagin et al. ................ 707/102 |
| 2007/0067298 A1 * | 3/2007 | Stoneman .................... 707/10 |

* cited by examiner

Primary Examiner—Khanh B Pham
Assistant Examiner—Van H Oberly
(74) Attorney, Agent, or Firm—Joseph R. Kelly; Westman, Champlin & Kelly, P.A.

(57) ABSTRACT

A search authoring tool for mapping queries to assets for use in an information retrieval system has a query-to-asset mappings database, a search authoring engine, and a search evaluation engine. The query-to-asset mappings database is built from search author input and user mappings. The search authoring engine is adapted to receive operator input and to generate one or more new query-to-asset mappings based on the received operator input. The search evaluation engine is adapted to compare the one or more new query-to-asset mappings to the existing mappings to determine if the one or more new query-to-asset mappings will cause performance degradation of the information retrieval system.

14 Claims, 8 Drawing Sheets

SEARCH AUTHORING METRICS AND DEBUGGING

BACKGROUND

The discussion below is merely provided for general background information and is not intended to be used as an aid in determining the scope of the claimed subject matter.

In general, search engines are applications designed to facilitate information retrieval. Automated search engines that rely on keyword matching typically return some useful information and many low-quality (or "junk") results. Over time, many search engines assemble an index of documents (sometimes called "assets") or a database of query-to-asset mappings. Not all mapped assets are relevant to a particular query. As query indexes and/or query databases increase in size, the precision with which queries are mapped to particular assets becomes critical. Otherwise, junk results can begin to overwhelm any results in which the user is interested.

Generally, search authoring tools are software applications adapted to allow a user to develop search logic and to inspect and adjust mappings created by the search application. Such search applications typically utilize search logic to map queries to assets. These mappings can then be stored in the index or database and surfaced to a user as found objects corresponding to a search query.

Many search engines generate new mappings, both automatically and in response to queries, as new material becomes available to the search engine, such as, for example, over a network such as the Internet. With the continuous addition of new mappings and new material, some existing mappings become irrelevant, new mappings may be irrelevant to a particular query, and the overall search engine performance can degrade as a result of the excess information and incorrect mappings of queries to assets. The searches overall become less relevant. As search results become less relevant to users, users will seek out different search engines for finding the information they need.

Conventionally, there is no easy way for a search author to determine the efficiency and efficacy of new mappings or of the mappings created using search authoring tools.

SUMMARY

This summary is provided to introduce in a simplified form some concepts, which are described below in the Detailed Description. This Summary is not intended to identify key features or essential features of the claimed subject matter, nor is it intended to be used as an aid in determining the scope of the claimed subject matter.

In one embodiment, a search authoring tool for mapping queries to assets for use in an information retrieval system has a query-to-asset mappings database, a search authoring engine, and a search evaluation engine. The query-to-asset mappings database of existing mappings is built from search author input and user mappings. The search authoring engine is adapted to receive operator input and to generate one or more new query-to-asset mappings based on the received operator input. The search evaluation engine is adapted to compare the one or more new query-to-asset mappings to the existing mappings to determine if the one or more new query-to-asset mappings will cause performance degradation of the information retrieval system. In one embodiment, the mappings stored in the query-to-asset mappings database can be generated automatically (by the system in which the search authoring tools live) and/or manually (by search authors through the search authoring tool user interface).

In another embodiment, a search authoring system has a runtime classifier model, a search authoring engine, and a search evaluation engine. The runtime classifier model is built from previously authored query-to-asset mappings and from user derived query-to-asset mappings. The search authoring engine is adapted to receive operator inputs and to generate one or more new query-to-asset mappings responsive to the operator inputs. The search evaluation engine is adapted to evaluate the one or more new query-to-asset mappings against the runtime classifier to determine if the one or more new query-to-asset mappings have an impact on performance of a search engine. The search evaluation engine is adapted to generate an evaluation output indicative of the impact.

In another embodiment, a method for evaluating query-to-asset mappings is provided. New query-to-asset mappings are authored for associating queries to assets in a content domain. The new query-to-asset mappings are evaluated against existing query-to-asset mappings using a search evaluation tool to determine an efficacy and an impact for each new query-to-asset mapping.

DETAILED DESCRIPTION

Figure 1:
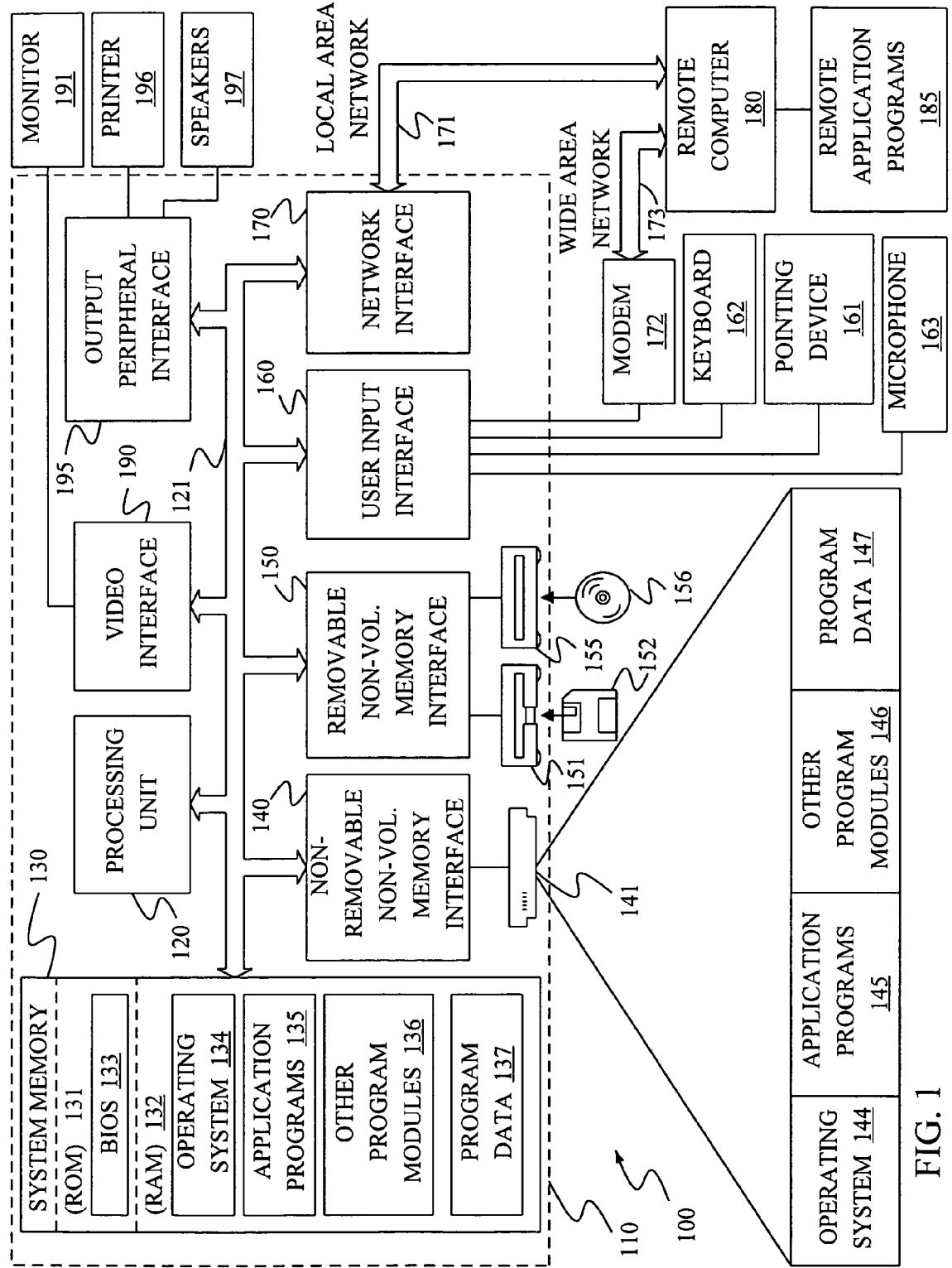
FIG. 1 is a diagrammatic view of the computing system environment on which embodiments of the present invention may be implemented.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well-known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, telephony systems, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention is designed to be practiced in distributed computing environments where tasks are performed by remote processing devices that are linked through a communications network. In a distributed computing environment, program modules are located in both local and remote computer storage media including memory storage devices.

With reference to FIG. 1, an exemplary system for implementing the invention includes a general-purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 is operated in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

It should be understood that embodiments of the invention can be operated on a computer system such as that described with respect to FIG. 1. Additionally, embodiments can be utilized on a server or on a distributed system in which different aspects are carried out on different components of the distributed system.

One embodiment includes a search authoring tool adapted to assist a search author in creating efficient query-to-asset mappings. The search authoring tool includes systems for creating new query-to-asset mappings, for analyzing the coverage of the new mappings, for analyzing the performance of the system given the new mappings, and for trimming or deleting mappings that degrade system performance.

Figure 2:
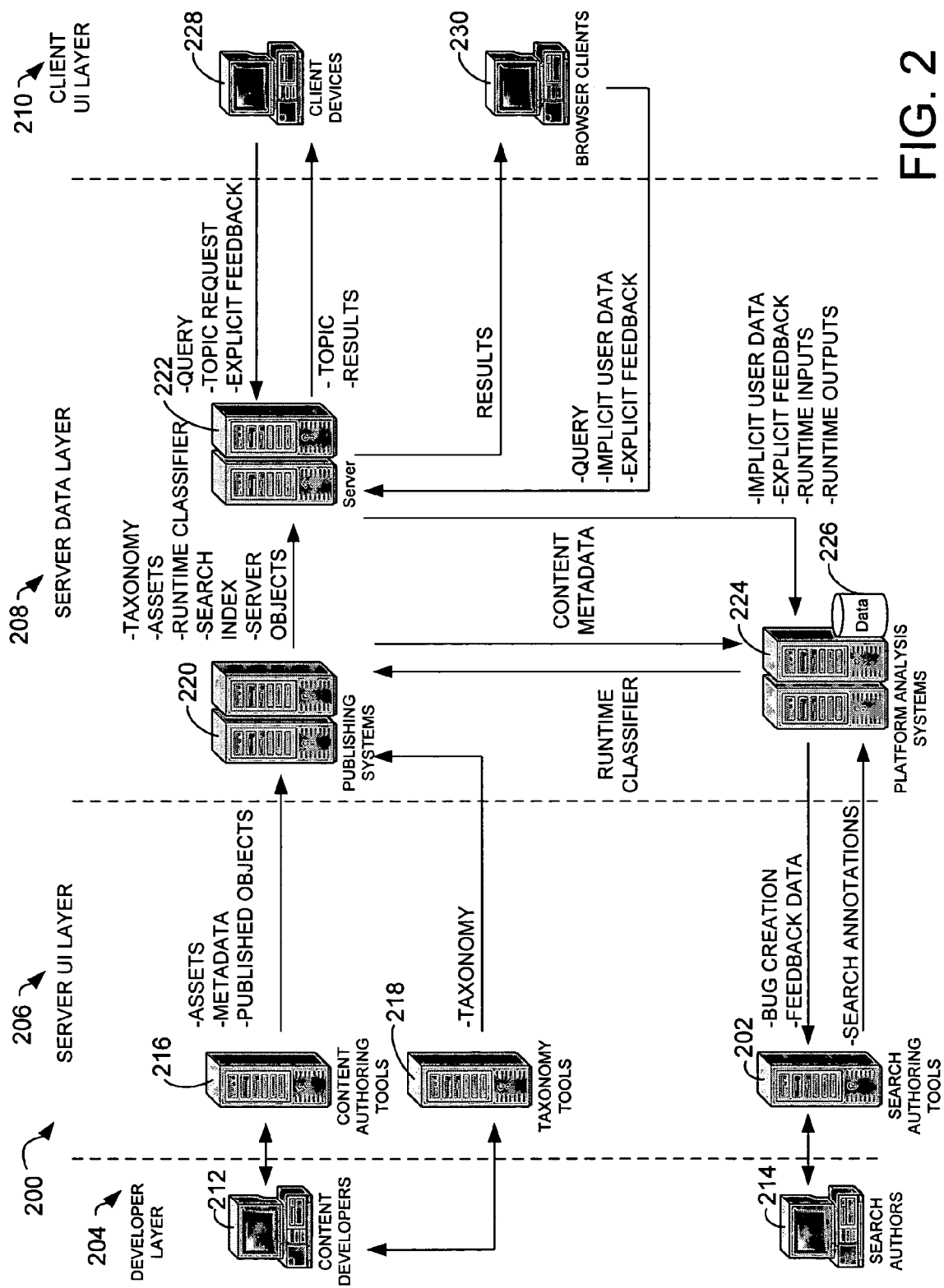
FIG. 2 is a simplified block diagram of a search system with search authoring tool according to an embodiment of the present invention.

FIG. 2 is a simplified block diagram of an embodiment of an information retrieval system 200 with search authoring tools 202. Generally, the information retrieval system 200 includes a developer layer 204, a server user interface (UI) layer 206, a server data layer 208, and a client layer 210.

The developer layer 204 generally includes content developers 212 and search authors 214. The server UI layer 206 generally includes content authoring tools 216, taxonomy tools 218, and search authoring tools 202. The server data layer 208 generally includes publishing systems 220, public servers 222, platform analysis systems 224, and associated data 226. The client UI layer 210 generally includes client devices 228 and browser clients 230. Each of the layers 204, 206, 208, and 210 and their associated elements can be communicatively coupled by a network, such as the Internet, for example.

Generally, the content developers 212 utilize content authoring tools 216 and taxonomy tools 218 to develop content. The content authoring tools generate content such as, for example, assets, associated metadata, and published objects (such as images, sound files, multimedia streams, and the like). The taxonomy tools 218 generate taxonomy information, such as lists of product specific terms to enhance search capabilities. The content and taxonomy information can be uploaded to the publishing systems 220 as a binary file, for example, which can be pushed onto the public servers 222, which deconstruct the binary file and put the data into a database for later retrieval.

Users utilize client devices 228 and/or browser clients 230 to query the servers 222. The servers 222 return results to the users based on the queries. Additionally, the servers 222 collect information from the user, including the query information, explicit feedback (such as responses to surveys, click button responses to questions about whether a particular result answered the query, and so on). Further, the servers 222 can be adapted to collect implicit feedback, such as how much time a user spent viewing a particular asset, whether a user printed a particular asset, whether a user has bookmarked a particular asset, how much time a user spent scrolling in a particular asset, and so on.

The servers 222 return such implicit feedback and explicit feedback, as well as runtime inputs and runtime outputs (such as the actual queries and the mapped results), and so on, to the database 226 of the platform analysis systems 224. Additionally, publishing systems 220 provide content metadata to the database 226 of the platform analysis systems 224.

Search authors 214 using search authoring tools 202 can access this feedback data, as well as bug creation data. The search authors 214 can use the feedback information to create new query-to-asset mappings, to trim existing mappings, and/or to add search annotations. These are returned to the platform analysis systems 224, which can analyze the mappings to determine if they will degrade the system 200. Additionally, the platform analysis systems 224 can be adapted to generate a runtime classifier based on the authored search mappings, and the like. A runtime classifier is generalized model capable of mapping queries to assets that can be used by a server to retrieve information responsive to a search. The platform analysis systems 224 can then upload the runtime classifier to the publishing systems 220, which can post them to the public servers 222.

Generally, a runtime classifier refers to a binary object comprised of several elements, including a query string, frequency information, and asset information. The runtime classifier is posted to the server 222. The classifier can be saved in a database. Upon receipt of a new query, a search algorithm locates assets associated with the query string, and returns the associated assets to the user.

Figure 3:
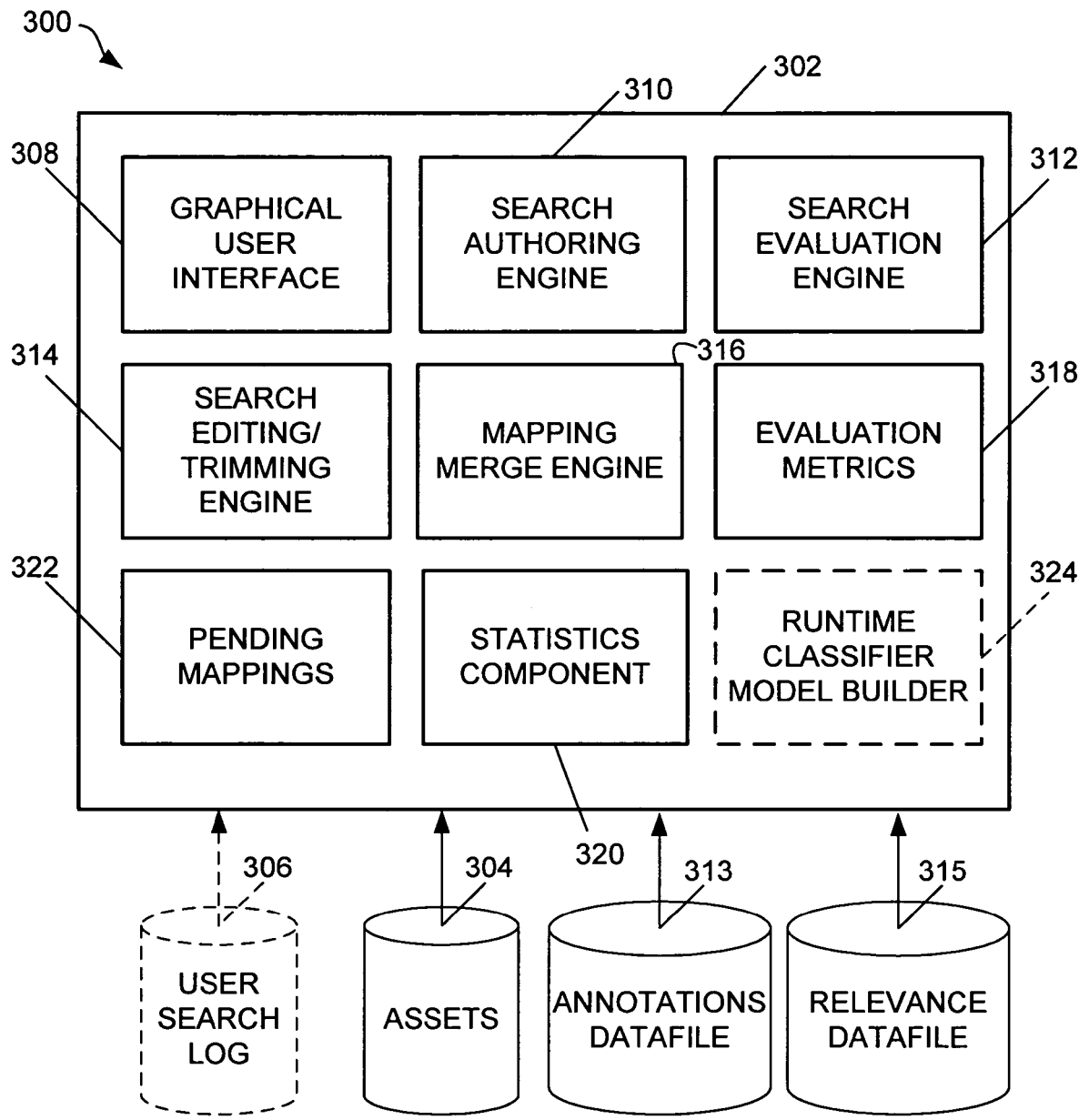
FIG. 3 is a simplified block diagram of a search authoring system according to an embodiment of the present invention.

FIG. 3 is a simplified block diagram of an embodiment of a search authoring system 300. The search authoring system 300 includes a search authoring tool 302 coupled to a database of assets 304 and optionally to a user search log 306 (shown in phantom). The term "asset" generally refers to any piece of content that is retrieved responsive to a search. The search authoring tool 302 includes a graphical user interface (GUI) 308, a search authoring engine 310, a search evaluation tool 312, a search editing/trimming engine 314, a mapping merge engine 316, evaluation metrics 318, a statistics component 320, pending mappings 322, and a runtime classifier model builder 324.

Generally, the GUI 308 is adapted to receive operator inputs and to display information to an operator, such as a search author, a developer and the like. The GUI 308 can include menus, buttons, links, and various other objects with which the user can interact. Additionally, the GUI 308 is adapted to interact with the search authoring engine 310, the search evaluation engine 312, and the search editing/trimming engine 314 to create new query-to-asset mappings, to evaluate the mappings, and to deploy new runtime classifier models that incorporate the new mappings.

In general, an operator can access the search authoring engine 310, the search evaluation engine 312, and/or the search editing/trimming engine 312 by invoking them from objects, menus, links or other elements within the GUI 308. The search authoring engine 310 is adapted to allow the operator to program new query-to-asset mappings. If a user search log 306 is available, the search authoring engine 310 can access query-to-asset mappings from the log 306 and derive new query-to-asset mappings from the log data. Alternatively, such mappings can be generated automatically from the log data.

If a user wants to retrieve information about configuring firewalls using a search engine, an example of a query could be "configure firewall", and an example of an asset is a document entitled "How to Configure a Firewall". When a user accesses a search engine, preferably the search engine will return assets with such a precise correspondence. However, the terms of the query may exist in other assets that are not necessarily related to configuring firewalls.

The search evaluation engine 312 is adapted to test new mappings that are created by an author using, for example, the search authoring engine 310. The search evaluation engine 312 (sometimes referred to as a runtime classifier evaluation component) determines the efficacy of created query-to-asset mappings, such as by testing the coverage of each new mapping to see that it retrieves the desired assets. Additionally, the search evaluation engine 312 tests the created mappings to ensure that they do not degrade the overall performance of the system. In one embodiment, the search evaluation engine 312 is adapted to evaluate newly authored mappings in combination with existing mappings to determine whether the newly authored mappings will degrade system performance. In another embodiment, the search evaluation engine 312 is adapted to evaluate a runtime classifier (generated by a runtime classifier model builder 324), which incorporates newly authored mappings with existing mappings using evaluation metrics 318 and using a statistical component 320, for example. The newly authored mappings can be merged with the existing mappings using the mapping merge engine 316. Additionally, the search evaluation engine 312 is adapted to generate an evaluation output that is indicative of the impact of the newly authored mappings on the performance of a search engine.

In one embodiment, the mapping merge engine 316 is adapted to eliminate redundant query-to-asset mappings and to merge unique query-to-asset mappings from the authored mappings into the existing mappings with appropriate weights added. In another embodiment, the merge engine 316 is adapted merge only those authored mappings that have been evaluated by the search evaluation engine 312 and determined not to degrade runtime performance.

Pending mappings 322 can include authored mappings that have been created by a search author using the search authoring engine 310, but which have not yet been evaluated. Additionally, pending mappings 322 can include query-to-asset mappings automatically generated from data in the user search log 306, but which have not yet been evaluated. In one embodiment, the search authoring tool 302 surfaces the pending mappings 322 to the search author within the GUI 308, so that the author can decide whether to add them to the runtime classifier or not.

Search editing/trimming engine 314 can be utilized to modify an existing runtime classifier. Moreover, particular mappings may become obsolete or may be determined to be an unsatisfactory result for a particular query. In such instances, the search author can use the search editing/trimming engine 314 to excise the particular query-to-asset mapping from the runtime classifier. Thus, the search authoring tool 302 provides a means for reducing the runtime classifier to improve overall system performance, efficiency, and precision.

During the process of analyzing the new mappings created by a search author using the search authoring engine 310, the search evaluation engine 312 and the statistics component 320 can be used to evaluate whether the mappings are good mappings (meaning that the mappings will not degrade the runtime classifier). The search evaluation engine 312 evaluates the new mapping that the search author created using the search authoring tool 310. The changes generated by the search author are compared against existing data from previous authored mappings stored within an annotations datafile (or database) 313 and compared against user mappings from a relevance datafile 315 (or database). The annotations datafile 313 is adapted to store query-to-asset mappings and their associated labels (such as satisfied, partially satisfied, dissatisfied, and the like). The relevance datafile 315 is adapted to store relevancy data associated with each of the query-to-asset mappings.

Figure 4:
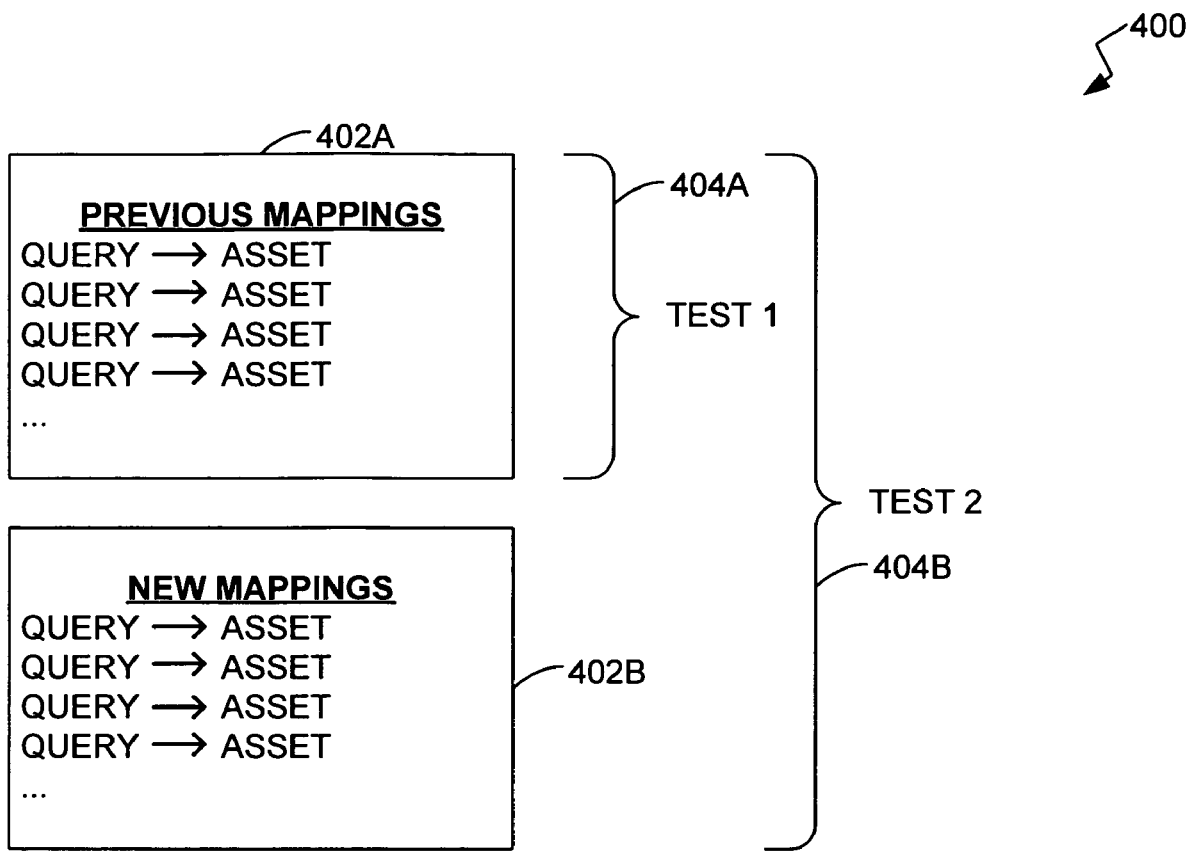
FIG. 4 is a simplified block diagram illustrating query to asset mappings utilizing a search authoring tool according to an embodiment of the present invention.

FIG. 4 is a simplified block diagram of an embodiment of query-to-asset mappings 400 on which tests can be run. Previous mappings 402A, including query-to-asset mappings that are stored in a database (such as annotations data file 313 in FIG. 3) and user mappings from a relevance data file (such as relevance data file 315 in FIG. 3), can be tested by building and evaluating a first runtime classifier built from the previous mappings 402A (Test 1, 404A). New mappings 402B can be tested with previous mappings 402A by building and evaluating a second runtime classifier (test 2, 404B). The comparison of these two runtime classifiers provides an indication to the search author if the new mappings 402B can maintain the performance of the runtime classifier containing just the existing data. If the performance of the second runtime classifier is worse than the first runtime classifier, then the new mappings will degrade the runtime performance.

To determine the effect of any individual new mapping, the training set for the second runtime classifier can be constructed from the previous mappings 402A and a single new mapping. With this approach, an evaluation tool, such as search evaluation tool 312 in FIG. 3, can test the effect of any subset of the new mappings.

If a set of new mappings decreases the quality measured by the set of metrics defined, the component first starts testing individual mappings, trying to single out the one that is responsible for quality or performance degradation. If the search evaluation tool (such as evaluation tool 312 in FIG. 3) cannot identify the single mapping causing the degradation, a selection algorithm can be applied to identify a subset of mappings that is responsible for degradation. The search author may choose to reject an entire set of mappings if it turns out to be computationally expensive to identify the specific subset.

Over time, specific query-to-asset mappings may be labeled or marked for trimming by an evaluation tool (such as search evaluation tool 312 in FIG. 3) based on user feedback, based on relevancy, based on performance degradation, and so on. Alternatively, such mappings may be labeled based on user feedback. Such labels can be used, for example, to identify obsolete mappings, irrelevant or incorrect mappings, and so on. In one embodiment, query-to-asset mappings that provide useful information responsive to a query can be labeled "satisfactory" or "SAT", while those that provide only partial information or non-useful (dissatisfactory) information can be labeled as "partially satisfactory" ("PSAT") or "dissatisfactory" ("DSAT"), respectively. In one embodiment, the search authoring tool is adapted to remove mappings labeled as DSAT mappings.

Figure 5:
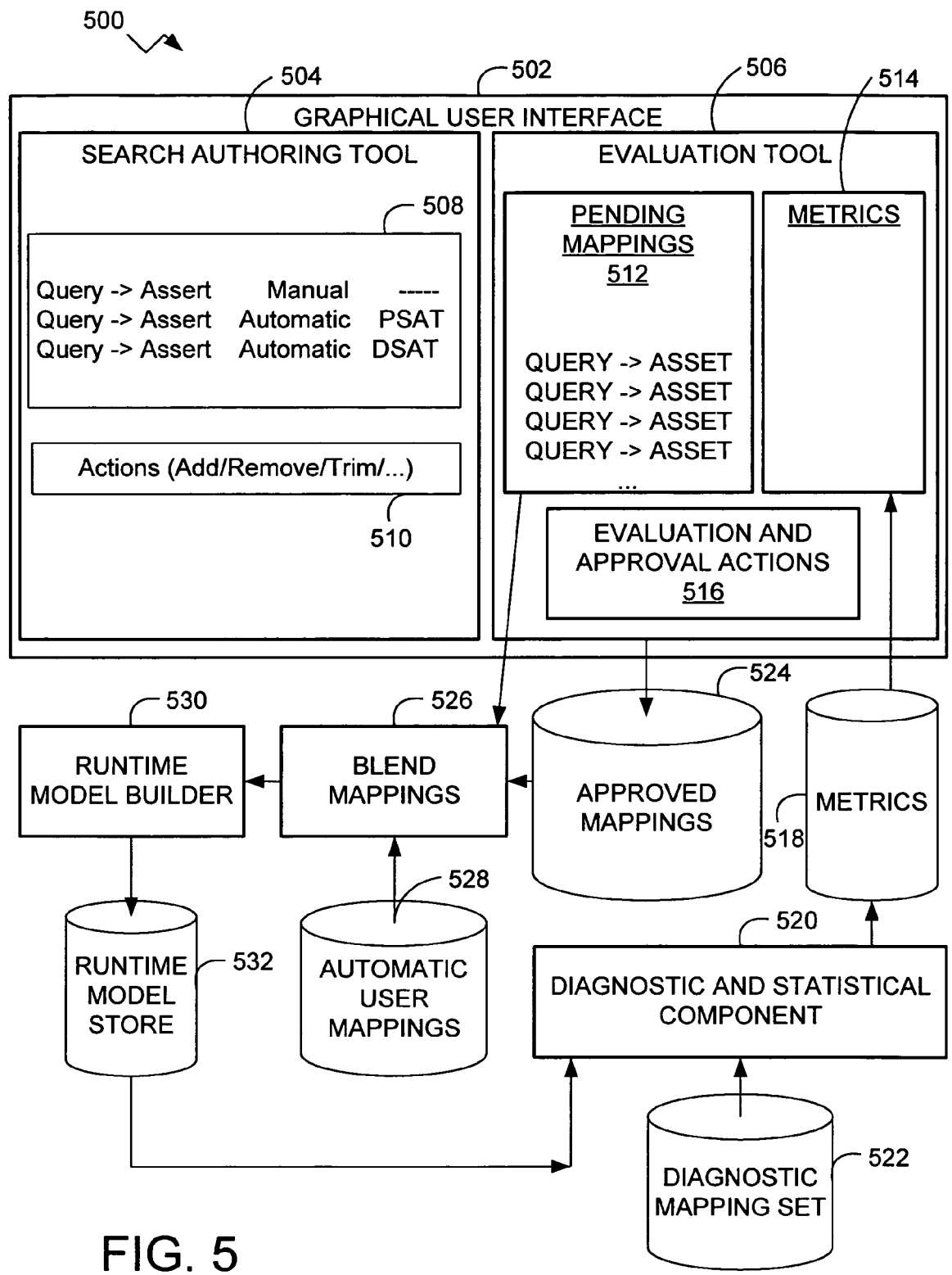
FIG. 5 is a simplified block diagram illustrating a search authoring system according to an embodiment of the present invention.

FIG. 5 is a simplified block diagram of an embodiment of a search authoring system 500. The system includes a graphical user interface 502 within which a search authoring tool 504 and an evaluation tool 506 can be operated. The search authoring tool 504 includes manual and automatic query-to-asset mappings 508 and actions 510 (such as operations that a search author can perform on the mappings 508).

The evaluation tool 506 includes pending mappings 512, metrics display 514, and evaluation and approval actions 516. In general, a search author can use the evaluation tool 506 to evaluate pending mappings 512 using performance metrics (such as performance metrics 518), which can be displayed in metrics display 514, and then, for example, to review and approve (or reject) one or more of the pending mappings. Approved mappings, including newly authored mappings and/or trimmed mappings, are pushed into an approved mappings store 524. This store 524 contains the resulting set of mappings.

Generally, the evaluation tool 506 causes newly authored mappings and mappings stored in the existing approved mappings store 524 to be merged or blended 526 with automatic user mappings 528. The automatic user mappings 528 can be generated automatically from a user log, for example (such as the user search log 306 in FIG. 3). Blended mappings 526 are then provided to a runtime model builder 530, which generates a runtime classifier model. The generated runtime classifier model is stored in the runtime model store 532.

When the author initiates an evaluation of a runtime classifier, a copy of the generated runtime classifier is provided to a diagnostic and statistical component 520. The diagnostic and statistical component 520 evaluates the generated runtime classifier against a diagnostic mapping set 522 and generates performance metrics 518. The search authoring tool or system 500 uses this component to calculate statistics of new mappings and the differences between the new mappings and existing mappings. Such statistics can include a number of unique queries per asset without new mappings, a query density in terms of asset titles without new mappings, the number of duplicate mappings in a new mapping set, a number of mappings that are redundant relative to existing mappings, and the number of new mappings that are unique relative to existing mappings. These statistics provide the search author with insight into the variability of queries that they are associating with assets.

The search authoring system 500 uses metrics 518 to determine whether changes have a positive or negative effect on performance. For example, metrics 518 can generally be divided into two categories, accuracy metrics and vocabulary variance metrics. The accuracy metrics represent a number of different search accuracy measurements, which can provide a search author within information for gauging how changes affect search performance. Examples of such accuracy metrics are shown in TABLE 1 below.

TABLE 1

| Metric | Description |
| --- | --- |
| Top 1-10 accuracy | Represents the top 1 through 10 accuracy figures for the new mappings. |
| Average rank in Top 10 Returns | The average rank for the correct results that are returned in the top 10. |

Thus, the results of the accuracy metrics provide insight to the search author regarding the overall precision of the newly authored mappings.

Another factor that can affect search performance is the degree of variance in the queries that are created or mapped to assets. This degree of variance can be referred to as vocabulary variance. Without vocabulary variance, there are fewer unique queries associated with a given asset. Thus, there is less coverage in terms of queries that might help surface that asset in a real-world search scenario. Examples of vocabulary variance metrics are provided in TABLE 2 below.

TABLE 2

| Metric | Description |
| --- | --- |
| Total number of Queries per asset | Measures the total number of raw queries per asset. |

TABLE 2-continued

| Metric | Description |
| --- | --- |
| Average number of unique queries per asset. | Measures the degree of vocabulary variation (i.e. unique queries) for a given query-to-asset mapping. |

The metrics described in TABLES 1 and 2 above are examples, and are not intended to be exhaustive of the various metrics that can be applied in evaluating mappings. Other metrics can also be used to evaluate mappings and overall system performance as desired.

Once the evaluation tool 506 has applied one or more of the selected metrics 518, the results can be displayed in metrics display 514 within the evaluation tool 506. In one embodiment, performance metrics 518 can be related to each particular query-to-asset mapping and can be displayed next to its associated mapping within evaluation tool 506 in the GUI 502.

In general, the system 500 provides an interface whereby a search author can access existing runtime classifiers, review the performance metrics, and remove or trim specific query-to-asset mappings from the runtime classifier. The trimmed runtime classifier can then be uploaded to a server (such as publishing systems 220 in FIG. 2).

In one embodiment, an evaluation tool 506 (or evaluation engine 312 in FIG. 3) assigns a label to a query-to-asset mapping based on the mapping's impact on overall system performance. For example, if a particular query-to-asset mapping receives satisfactory or very satisfactory feedback, the particular mapping may be labeled VSAT. If, however, user feedback is negative, then the mapping can be labeled DSAT. Alternatively, the evaluation tool 506 can assign such a label based on extent of performance degradation attributable to the particular mapping. If a mapping causes degradation of the system performance, it may be labeled DSAT (and thereby marked for removal). The search author can then use evaluation tool 506 to accept or reject proposed deletions, remove or reassign the label, or otherwise evaluate the proposed actions before the system 500 changes the runtime classifier.

As the search authoring tool identifies degradation in runtime classifier, the tool can be used to trim mappings. For example, assets that have been added to the runtime classifier mappings can be trimmed if they no longer exist, if they become legacy assets (such as an earlier version of a standard document, and the like). Redundant objects may also be trimmed. As search habits change over time, it may be desirable to trim certain mappings from the runtime classifier.

Figure 6:
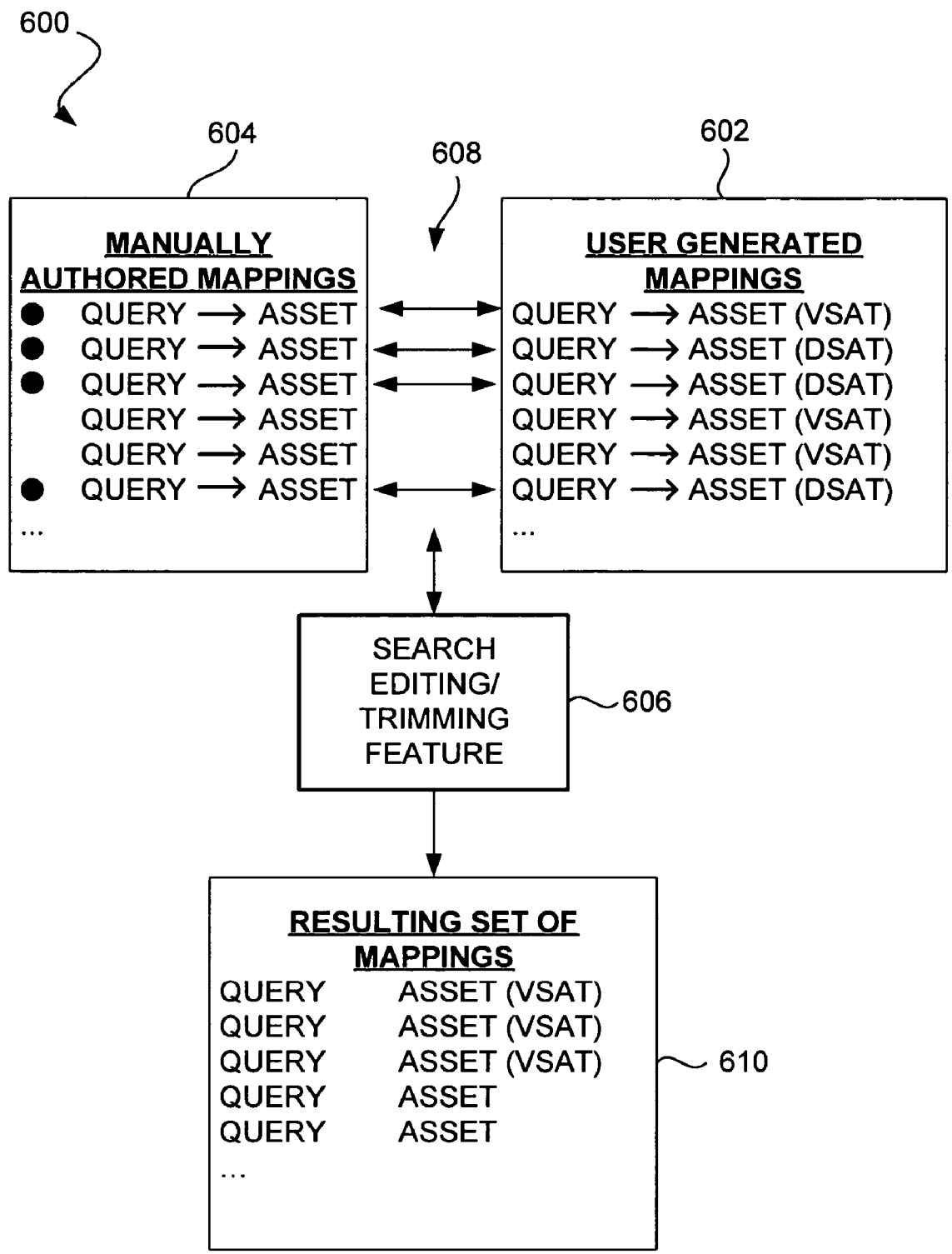
FIG. 6 is a simplified flow diagram illustrating a process for trimming objects from a database of query-to-asset mappings according to an embodiment of the present invention.

FIG. 6 is a simplified flow diagram illustrating an embodiment of a process 600 for editing/trimming query-to-asset mappings. The search authoring tool (SAT) enables search authors to preview and trim existing mappings created by all search authors and created automatically based on user mappings. For example, authors can check author mappings against dissatisfied mappings (negative association between a query and an asset) from users and identify candidate author mappings to trim.

The manually authored query-to-asset mappings are compared against the user generated mappings (that is, the mappings that result from logging on the server and the relevance classification process described above). User generated mappings 602 include a plurality of query-to-asset mappings assembled from user queries. Over time, the system has labeled some of the plurality of query-to-asset mappings as being "dissatisfactory" or DSAT and some as being "very satisfactory" or VSAT. Manually authored mappings 604 include query-to-asset mappings created by a search author using a search authoring tool (such as search authoring tool 300 in FIG. 3 or system 500 in FIG. 5).

A search editing/trimming feature 606 compares the manually authored mappings 604 against the user generated mappings 602, identifies duplicates 608, and generates a resulting set of mappings 610. The search editing/trimming feature 606 looks for mappings between queries and assets and then marks the mapping for removal if the asset is marked as DSAT (dissatisfied search authoring tool mapping) or if the mapping is a duplicate of an existing mapping.

Authors can also identify mappings from users that they believe are not appropriate, and mark them as candidates for trimming (removal). An example would be a politically sensitive mapping that needs to be trimmed, such as searches relating to pre-election polling after the election is complete. Before mapping removal candidates are actually trimmed, the metrics and processes described above can be used to measure the impact of trimming the mappings to ensure that such trimming does not degrade performance in the runtime classifier. The decision to trim can be made by authors based on the impact of this evaluation.

The resulting set of mappings 610 includes query-to-asset mappings from both the manually authored mappings 604 and the user generated mappings 602, which are unique and which are not labeled DSAT. Non-unique mappings and mappings labeled DSAT are eliminated, thereby improving search performance.

Figure 7:
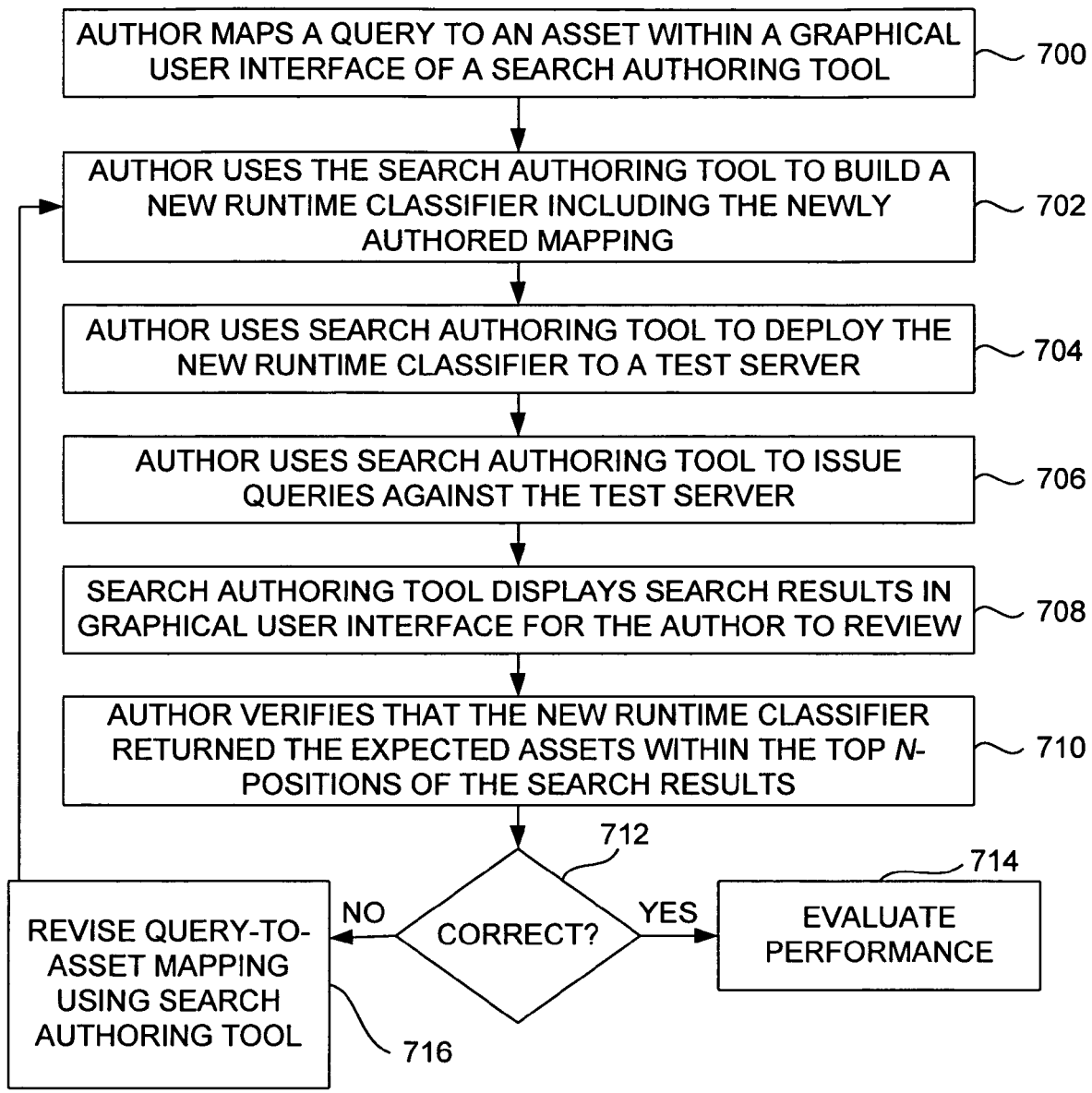
FIG. 7 is a simplified flow diagram illustrating a method for coverage testing a new query-to-asset mapping using a search authoring system according to an embodiment of the present invention.

FIG. 7 is a simplified flow diagram illustrating an embodiment of a process for testing coverage of a new query-to-asset mapping. A coverage test for testing a new query to asset mapping through a real search involves testing the search against the mappings and against content or assets. The goal of this task is to verify that the assets mapped to a specific query actually appear or surface responsive to a query a search is run.

An author maps a query to an asset within a graphical user interface of a search authoring tool (step 700). The author uses the search authoring tool to build a new runtime classifier including the newly authored mappings (step 702). The author then uses the search authoring tool to deploy the new runtime classifier, for example, to a test server (step 704). The author uses the search authoring tool to issue queries against the test server (step 706). The search authoring tool displays search results in the graphical user interface for the author to review (step 708). The author verifies that the new runtime classifier returned the expected assets within the top N-positions of a search results list (step 710). If the new runtime classifier returned the correct results (step 712), the search author can then access an evaluation tool to evaluate the performance of the new runtime classifier, for example, as compared to a performance evaluation of the previous runtime classifier (step 714). If the new runtime classifier did not return the correct results (step 712), the author can then revise one or more query-to-asset mappings using the search authoring tool (step 716), and repeat steps 702 and sequence until the correct results are returned (step 712). This process can be automated to give a summary of coverage of based on a given list of queries and expected results from the search author.

Figure 8:
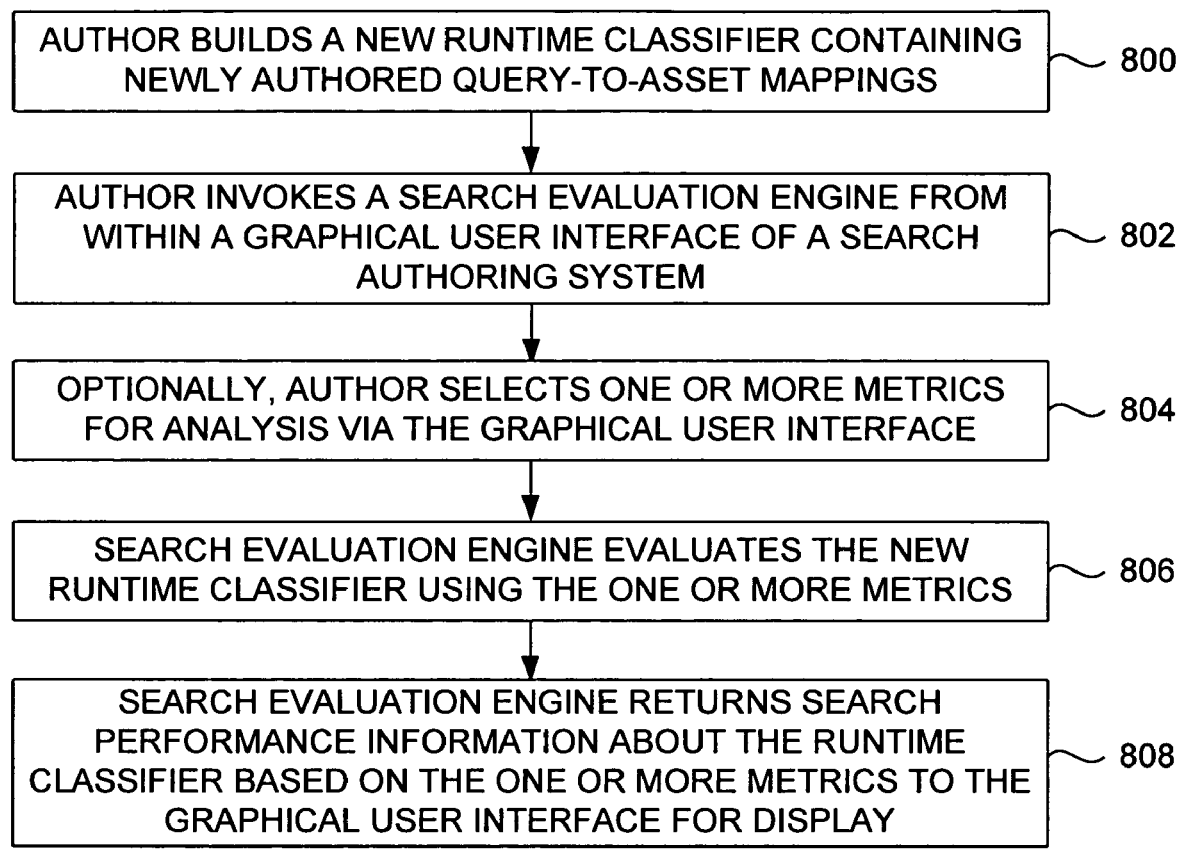
FIG. 8 is a simplified flow diagram illustrating a method for evaluating new query-to-asset mappings according to an embodiment of the present invention.

FIG. 8 is a simplified flow diagram illustrating an embodiment of a process for evaluating a new run-time classifier based on newly authored query-to-asset mappings. The search author builds a new runtime classifier containing the newly authored query-to-asset mappings (step 800). The author invokes a search evaluation engine within a graphical user interface of a search authoring system (step 802). In one embodiment, the search author selects one or more metrics from a plurality of performance metrics for analysis via the graphical user interface (step 804). In an alternative embodiment, the search evaluation tool analyzes the runtime classifier based on a predetermined set of performance metrics.

Upon invocation by the search author (step 802) or upon selection of performance metrics (step 804) depending on the implementation, the search evaluation engine evaluates the new runtime classifier using the one or more metrics (step 806). The search evaluation engine then returns performance information about the runtime classifier based on the one or more metrics to the graphical user interface for display.

Although the present invention has been described with reference to particular embodiments, workers skilled in the art will recognize that changes may be made in form and detail without departing from the spirit and scope of the invention.

What is claimed is:

1. A search authoring tool for mapping queries to assets for use in an information retrieval system, the search authoring tool comprising:
   a memory adapted to store processor-executable instructions that map queries to assets, the processor-executable instructions comprising:
   a query-to-asset mappings database of approved mappings built from search author input and user mappings;
   a search authoring engine receiving operator input and generating a plurality of pending query-to-asset mappings based on the received operator input;
   a search evaluation engine comparing a performance of a first runtime classifier built from the approved mappings against a second runtime classifier built from the mappings and the plurality of pending query-to-asset mappings to determine whether using the plurality of pending query-to-asset mappings causes performance degradation of the information retrieval system, the search evaluation engine comparing performance of the first runtime classifier built from the approved mappings against performance of the second runtime classifier by comparing performance of the first runtime classifier against the performance of a plurality of second runtime classifiers built from the approved mappings and a plurality of different subsets of the pending query-to-asset mappings to identify specific subsets of the pending query-to-asset mappings that cause the performance degradation, the search evaluation engine marking for removal at least one of the plurality of pending query-to-asset mappings based on a determination that the at least one of the plurality of pending query-to-asset mappings is in an identified specific subset of the pending query-to-asset mappings that causes performance degradation; and
   a processor coupled to the memory and being a functional part of the search authoring tool and being activated by the search authoring engine and the search evaluation engine to facilitate mapping queries to assets for use in an information retrieval system.

2. The search authoring tool of claim 1 further comprising:
   a statistical component executable by the processor to calculate statistics for the one or more pending query-to-asset mappings, based on the performance of the runtime classifier and the plurality of second runtime classifiers, to determine whether performance degradation of the information retrieval system has occurred.

3. The search authoring tool of claim 2 wherein the statistical component is executable by the processor to calculate differences in performance of the plurality of second runtime classifiers built from the approved query-to-asset mappings and the pending query-to-asset mappings and the runtime classifier built from the approved mappings.

4. The search authoring tool of claim 1 further comprising:
   a runtime classifier model builder executable by the processor to generate the plurality of second runtime classifiers from the one or more pending query-to-asset mappings and the approved mappings.

5. The search authoring tool of claim 1 wherein the search evaluation tool is executable by the processor to label particular query-to-asset mappings of the approved mappings, the search authoring tool further comprising:
a search trimming feature executable by the processor to remove the particular query-to-asset mappings from the query-to-asset mappings database based on the label.

6. The search authoring tool of claim 5 further comprising:
an annotations database accessible to the processor and adapted to store approved query-to-asset mappings and their associated labels; and
a relevance database accessible to the processor and adapted to store relevancy data associated with each of the approved query-to-asset mappings;
wherein each approved query-to-asset mapping is labeled based on its associated relevancy data, if available, and stored in the annotations database with the associated label.

7. A search authoring system comprising:
a first runtime classifier model built from previously authored query-to-asset mappings and from user derived query-to-asset mappings;
a search authoring engine receiving operator inputs and generating one or more pending query-to-asset mappings responsive to the operator inputs;
a search evaluation engine evaluating performance of a plurality of second runtime classifiers built from different subsets of the one or more pending query-to-asset mappings and the previously authored query-to-asset mappings against performance of the first runtime classifier to determine if the one or more pending query-to-asset mappings has an impact on performance of a search engine, the search evaluation engine generating an evaluation output indicative of the impact, the search evaluation engine marking one or more query-to-asset mappings for removal based on the impact;
a diagnostic and statistical component calculating statistics for each of the one or more pending query-to-asset mappings and to provide the calculated statistics to the search evaluation engine, wherein the search evaluation engine calculates the evaluation output based on the calculated statistics, the diagnostic and statistical component calculating, as the calculated statistics, performance metrics, indicative of an accuracy of the search engine, and vocabulary variance metrics, indicative of a degree of variance in language of different queries mapped to a given asset, for a plurality of different subsets of the one or more pending query-to-asset mappings; and
a computer processor being a functional component of the authoring system and activated by the search authoring engine and the search evaluation engine to facilitate receiving operator inputs and evaluation.

8. The search authoring system of claim 7 wherein if the impact is negative, the evaluation output comprises the one or more query-to-asset mappings that are marked for removal.

9. The search authoring system of claim 7 further comprising:
a runtime classifier model builder building a new runtime classifier from a combination of the previously authored query-to-asset mappings, the user derived query-to-asset mappings, and the one or more pending query-to-asset mappings.

10. The search authoring system of claim 7 further comprising:
a search editing/trimming tool deleting one or more query-to-asset mappings from the runtime classifier based on the evaluation output.

11. A method for evaluating query-to-asset mappings comprising:
authoring pending query-to-asset mappings for mapping queries in an information retrieval system to assets associated with one or more databases;
evaluating with a computer processor performance of a classifier built from a combination of one or more different subsets of the pending query-to-asset mappings and approved query-to-asset mappings against performance of a second classifier built only from the approved query-to-asset mappings using a search evaluation tool to determine search result coverage and a performance impact on a search engine for each new query-to-asset mapping;
marking, with the processor, one or more of the pending query-to-asset mappings or the approved query-to-asset mappings for removal based on the performance impact; and
removing the marked query-to-asset mappings to obtain a modified set of query-to-asset mappings;
wherein evaluating to determine coverage includes:
uploading the classifier built from the combination of the approved query-to-asset mappings and the one or more different subsets of pending query-to-asset mappings to a test server coupled to the one or more databases for which the approved query-to-asset mappings and pending query-to-asset mappings are relevant;
posting search queries to the test server;
receiving search results from the test server responsive to the posted search queries; and
verifying whether the pending query-to-asset mappings have a correct coverage by comparing the received search results against a set of expected results, wherein comparing the received search results against a set of expected results comprises:
determining whether the received search results contain the set of expected results in a top-N positions of the received search results.

12. The method of claim 11 wherein the step of evaluating comprises:
building a first runtime classifier based on the approved query-to-asset mappings;
building a second runtime classifier based on a combination of the approved query-to-asset mappings and the pending query-to-asset mappings; and
comparing the first runtime classifier and the second runtime classifier to identify differences.

13. The method of claim 12 wherein the identified differences comprise differences in performance, in statistics, and in coverage.

14. The method of claim 11 wherein the performance impact comprises a new performance evaluation of the search engine performing a search using the pending query-to-as set mappings relative to a previous performance evaluation of the search engine associated with the approved query-to-asset mappings, wherein if the new performance evaluation is negative relative to the previous performance evaluation, the method further comprises:
generating a list of query-to-asset mappings, wherein one or more query-to-asset mappings are marked for removal based on the determined performance impact.

* * * * *

UNITED STATES PATENT AND TRADEMARK OFFICE
CERTIFICATE OF CORRECTION

| | | |
|---|---|---|
| PATENT NO. | : 7,783,657 B2 | Page 1 of 1 |
| APPLICATION NO. | : 11/144268 | |
| DATED | : August 24, 2010 | |
| INVENTOR(S) | : Steven Fox et al. | |

It is certified that error appears in the above-identified patent and that said Letters Patent is hereby corrected as shown below:

In column 14, line 55, in Claim 14, delete "query-to-as set" and insert -- query-to-asset --, therefor.

Signed and Sealed this
Tenth Day of May, 2011

David J. Kappos
*Director of the United States Patent and Trademark Office*